United States Patent [19]
Rhodes, Jr.

[15] 3,639,039
[45] Feb. 1, 1972

[54] APPARATUS UTILIZING SPATIAL PLANE FILTERING FOR PERFORMING OPTICAL IMAGE ENHANCEMENT

[72] Inventor: Joseph E. Rhodes, Jr., Marietta, Ga.
[73] Assignee: Lockheed Aircraft Corporation, Burbank, Calif.
[22] Filed: Oct. 22, 1964
[21] Appl. No.: 405,802

[52] U.S. Cl. ...................................... 350/162 SF, 350/272
[51] Int. Cl. ........................................................ G02b 27/38
[58] Field of Search .................... 350/17, 162, 205, 271, 272, 350/273, 274, 162 SF

[56] References Cited

UNITED STATES PATENTS

| 2,016,025 | 10/1935 | Scribner et al. | 350/272 |
| 2,964,998 | 12/1960 | Middlestadt | 350/271 |
| 3,052,150 | 9/1962 | Jonker | 88/1 |
| 3,305,834 | 2/1967 | Cooper et al. | 88/1 UX |
| 2,050,417 | 8/1936 | Bocca | 352/45 |
| 3,427,104 | 2/1969 | Blikken et al. | 350/162 X |

Primary Examiner—John K. Corbin
Attorney—George C. Sullivan

[57] ABSTRACT

An optical image processor utilizing filtering in the spatial image plane to enhance selected details of an optical image such as a photographic transparency. Spatially coherent light is passed through an optical train including a transparency of a scene to be enhanced and the image of the light source is focused onto a plane containing a spatial filter which may consist of a slit of variable dimension and orientation. The geometric patterns of the scene on the transparency function as diffraction gratings for the coherent light and the desired diffraction patterns are selected by a spatial filter of the appropriate dimension and location. The filter may be rotated to provide a cyclically recurring enhanced image.

3 Claims, 5 Drawing Figures

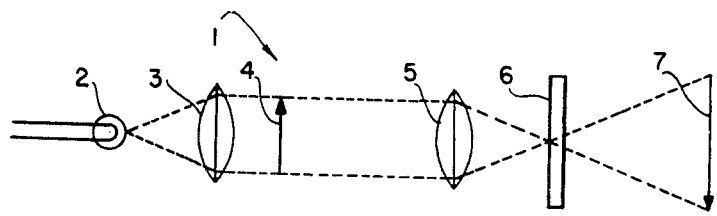
FIG_1
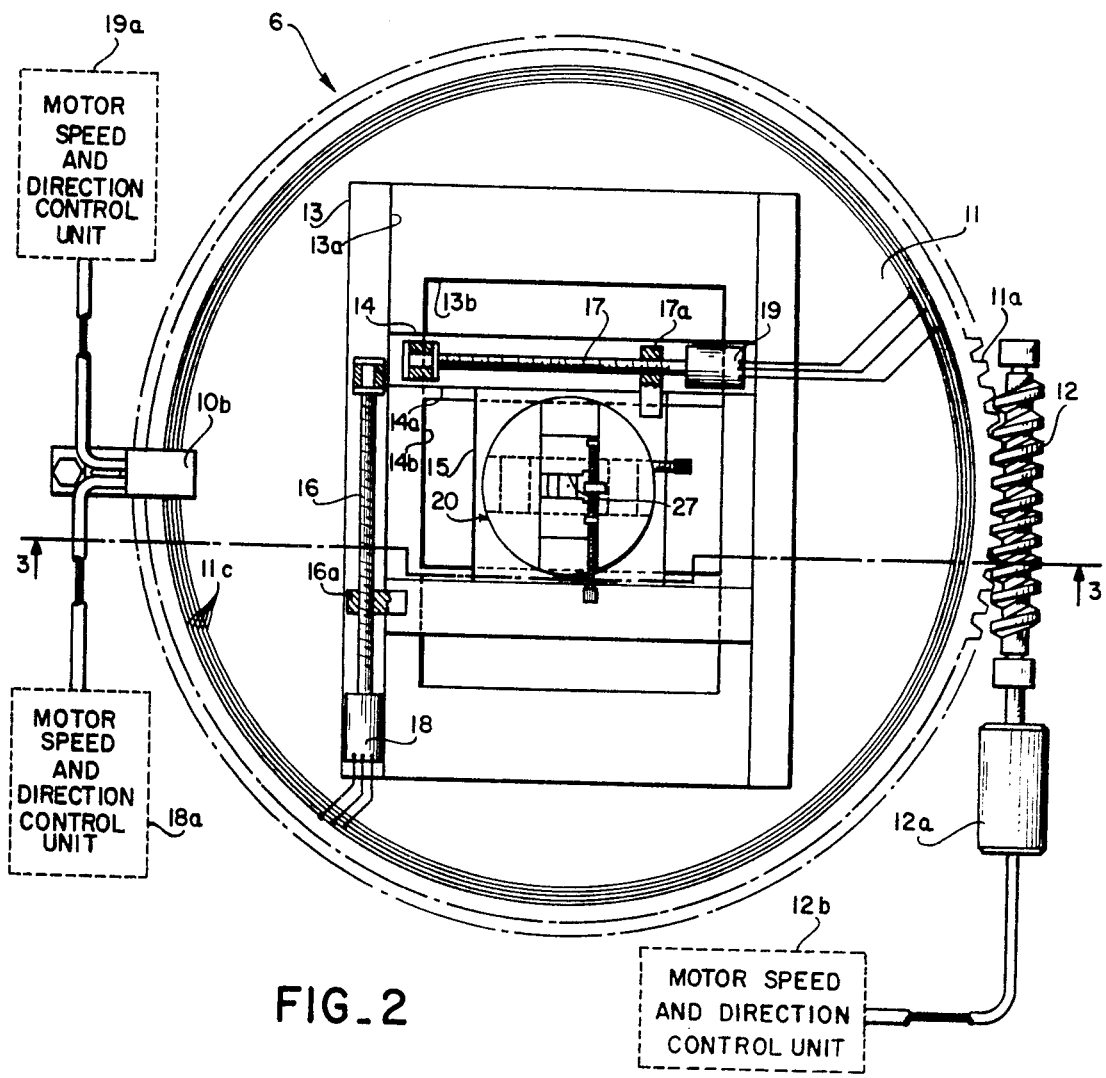
FIG_2
INVENTOR.
JOSEPH E. RHODES, JR.

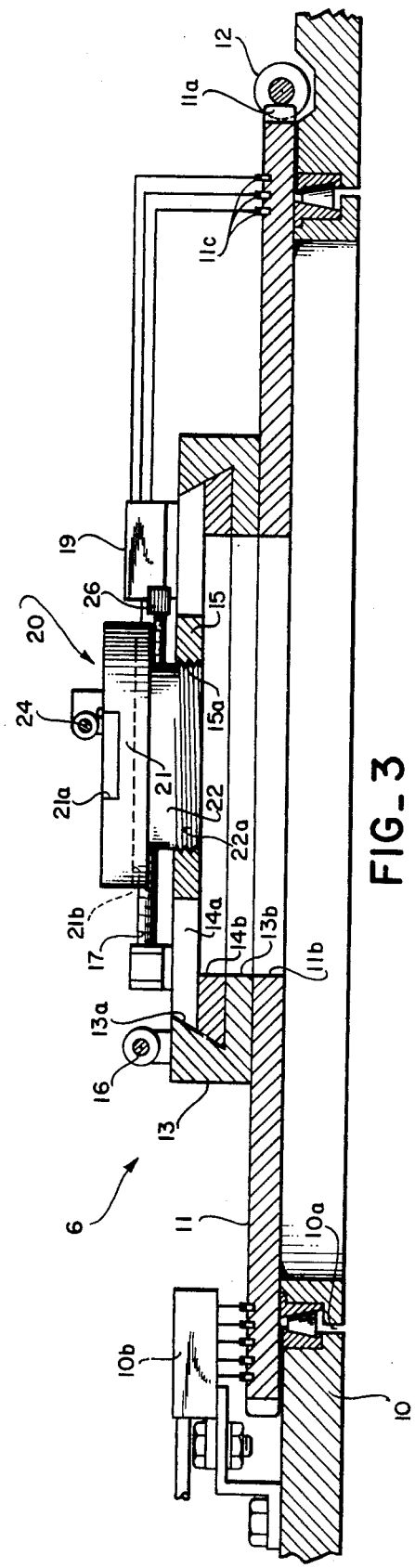
FIG_3
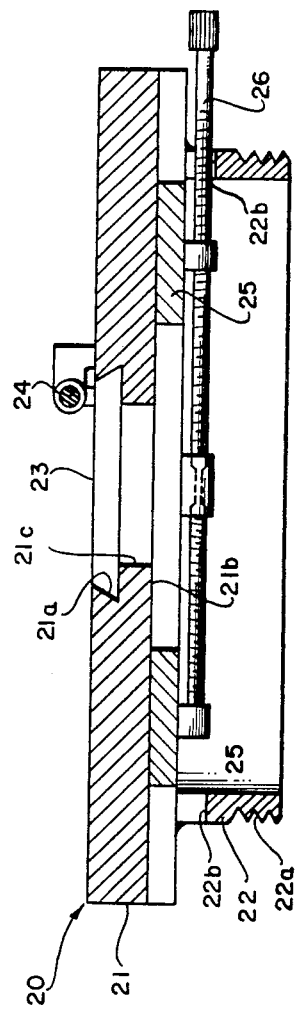
FIG_5
INVENTOR.
JOSEPH E. RHODES, JR.

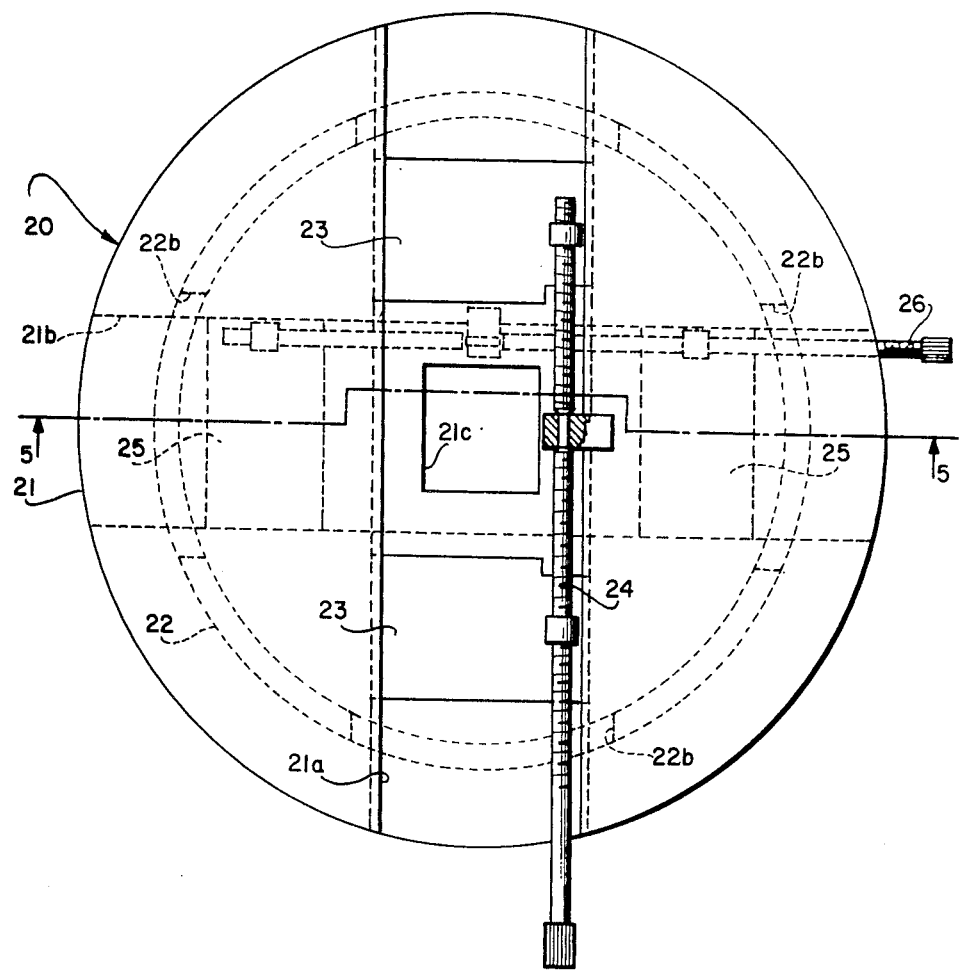
FIG_4

APPARATUS UTILIZING SPATIAL PLANE FILTERING FOR PERFORMING OPTICAL IMAGE ENHANCEMENT

This invention relates to an optical image processor, and more particularly to an optical apparatus for enhancing selected pictorial details in a scene with respect to its surroundings.

Presently, selected pictorial details in a scene are detected by onsite visual inspection or from the study of photographs at a later date. The detection of selected pictorial details by visual analysis is a tedious and fatiguing process, and its difficulty is materially increased when the pictorial details are obscured due to interference by the atmosphere or other features in the vicinity. The detection of such pictorial details is facilitated in accordance with this invention by the enhancement of selected pictorial details in a scene relative to background structure by optical method and apparatus.

Accordingly, it is an object of this invention to provide an apparatus for optically enhancing selected pictorial details in a scene.

Another object of this invention is to provide an apparatus for optically scanning a scene in spatial frequency.

A further object of this invention is to provide an apparatus for optically scanning a scene to detect the spatial frequency and orientation of selected pictorial details in the scene.

A still further object of this invention is to provide an apparatus for optically enhancing selected pictorial details in a scene so as to make the selected pictorial details blink.

Another object of this invention is to provide an apparatus for providing a display of a scene and optically enhancing selected pictorial details in the scene by color contrast.

The exact nature of this invention as well as other objects and advantages thereof will be readily apparent from consideration of the following specification relating to the annexed drawings in which:

FIG. 1 shows a schematic view of an optical train according to this invention;

FIG. 2 shows a plan view of an embodiment of this invention;

FIG. 3 shows a section of the embodiment taken along line 3—3 of FIG. 2 looking in the direction of the arrows;

FIG. 4 shows a plan view of a portion of the embodiment of FIG. 2; and

FIG. 5 shows a section of the embodiment along line 5—5 of FIG. 4 looking in the direction of the arrows.

Generally stated, this invention comprises an apparatus for optically enhancing selected pictorial details in a scene wherein spatially coherent light is passed through an optical train having a transparency of a scene located therein such that the image of the light source is focused upon a spatial filter located in the optical train. The spatial filter has an aperture therein which passes selected spatial frequencies of the scene therethrough to the image plane and the aperture in the spatial filter is selectively adjustable in accordance with a preselected scanning mode within the spatial filter plane and is also adjustable in size whereby selected pictorial details in the scene may be enhanced.

More specifically, there is shown schematically in FIG. 1 an optical image processor 1 comprising a spatially coherent or point light source 2, an illuminating lens 3 for collimating light from source 2, a transparency 4 containing an image of a scene having selected pictorial details therein which are desired to be enhanced, an objective lens 5, a spatial filter 6 mounted at the focal plane of the objective lens 5 and an image plane 7 which may be a screen or a plane viewed by the eye. Various changes may be made in the organization of the lens elements of the optical train thus formed so long as spatial filtering can be carried out in the spatial filter plane, the plane where the image of the source is formed.

The geometric patterns of the scene in transparency 4 act as diffraction gratings for the coherent light source 2 so that the geometric patterns effect a diffraction of the light passing through the scene. Thus, if the transparency 4 were removed from the optical train, the coherent light source 2 would be focused on the spatial filter 6, forming what is known as the central image. However, with the transparency 4 in place, the pictorial details of the scene cause the light passing therethrough to be partially diffracted from the central image, in accordance with the geometric patterns of the scene to form in the plane containing the spatial filter a spatial spectrum representative of the pictorial details of the scene. The displacement of these spatial frequency components or signals of the transparency image outwardly from the central image increases as a direct function of the frequency of repetition of the geometric pattern components of the scene structure. Thus, if in a particular scene there is a railroad having a plurality of closely spaced railroad ties and a new subdivision for which parallel streets have recently been cut, the railroad ties will have a relatively high spatial frequency component, with a large displacement from the central image, while the parallel streets will have a much lower spatial frequency component with a correspondingly lesser displacement from the central image. Since the railroad ties diffract the light impinging thereon by a greater degree than do the parallel streets, the signal produced in the spatial filter plane by the railroad ties will be displaced outwardly from the central image a greater distance than will the corresponding signal of the parallel streets. The spatial filter 6 is provided with a small aperture which will pass the signal of that structure which has been diffracted into coincidence with the aperture while excluding other spatial frequency components.

By knowing the spatial frequency distribution of a selected pictorial detail being sought, such a detail can be automatically enhanced by inserting into the optical train a spatial filter having an aperture therein which corresponds in size and location to the spatial frequency component or signal, or distribution thereof, of the pictorial detail being sought (preferably that component with the highest spectral energy of the pictorial detail being sought). Unfortunately, however, the characteristics of the pictorial details that produce its spectral distribution in the spatial filter plane are only known in general terms. Also, the spatial frequency of a given pictorial detail, as seen in the spatial filter plane, increases as a direct function of the distance from which the pictorial detail was photographed. Moreover, it is sometimes desirable to detect selected pictorial details wherein the frequency of repetition of its components vary, causing its spectral frequency components to be distributed over a narrow band width in the spatial filter plane. Accordingly, it is impractical to use a spatial filter with an aperture of fixed size and position to locate selected structure in a scene.

Therefore, to make practical the optical enhancement of selected pictorial details in a scene, it is necessary to make the position of the aperture in the spatial filter adjustable in all directions in the spatial filter plane to make it possible to scan the spatial spectrum in the spatial filter plane to locate the frequency component of the signal being sought. This normally would be over a predetermined bandwidth which would be suspected to contain the frequency of the selected pictorial detail. Also, since the bandwidth of spatial frequencies passed through the filter depends upon the size of the aperture, the aperture size is made adjustable to make possible the selective discrimination as to the bandwidth of the frequency component passed through the spatial filter. Further, since the angle at which the pictorial detail is photographed determines the angular position and the frequency of the spectral energy produced thereby, it is desirable to determine the orientation of the pictorial detail by permitting the relative orientation of the transparency and the aperture to be varied.

A typical spatial filter 6 is shown in detail in FIGS. 2 and 3 wherein the spatial filter 6 is mounted on the support 10 having the opening 10a therethrough. The spatial filter 6 comprises a gear wheel 11 provided with gear teeth 11a, a central opening 11b and the concentrically related sliprings 11c. A drive gear assembly 12, preferably driven by a reversible variable speed DC motor 12a controlled by the motor speed and direction control unit 12b, is drivingly connected to the gear teeth 11a of the gear wheel 11 for rotation of the gear wheel 11 in either direction in accordance with a preselected program. Additionally, a conventional slipring contact assembly 10b is mounted by a bracket above the gear wheel 11 with its electrical contact elements in contact with the sliprings 11c formed on the gear wheel 11.

A baseplate 13, provided with a dovetailed groove 13a having an opening 13b therethrough, is fixedly mounted on the gear wheel 11. Mounted in the groove 13a is a slide block 14, which is provided with a dovetailed groove 14a oriented in the transverse direction with respect to the groove 13a and having an opening 14b therethrough. Slidably mounted in the groove 14a is a second slide block 15 which has a threaded central opening 15a. The first slide block 14 is operatively connected by the connector 16a to an actuator screw 16 mounted on the baseplate 13, and the second slide block 15 is operatively connected by the connector 17a to an actuator screw 17 on the first slide block 14. In turn, the actuator screws 16 and 17 are connected to the reversible variable speed DC motors 18 and 19 for selective bidirectional movement perpendicular to one another in their respective slots. The motors 18 and 19 are connected to the motor control circuits 18a and 19a, which control the speed and direction of the motor shafts by selectively varying the power supply to the motors in amplitude for speed control and in sign for reversing control by conventional electric motor control techniques. The connection of motors 18 and 19 to the motor control circuits 18a and 19a is through the sliprings 11c formed on the gear wheel 11 and the slipring contact assembly 10b mounted on the support 10.

Also included in the spatial filter 6 is an aperture block 20 which is threadedly secured in the central opening 15a of the slide block 15. As best seen in FIGS. 3, 4 and 5, aperture block 20 comprises a baseplate 21 having perpendicularly related grooves 21a and 21b formed in its opposite sides and a central opening 21c at the intersection of these grooves. Projecting from one side of the baseplate 21 is a tubular member 22 which is provided with screw threads 22a on its free end and cutouts 22b in its base in straddling relationship to groove 21b. Two shutters 23 are mounted in slot 21a, one of each side of opening 21c, which are connected to screw actuator 24 for simultaneous inward and outward movement relative to the opening 21c. Similarly, two shutters 25 are mounted in slot 21b, one on each side of opening 21c, which are connected to screw actuator 26 for simultaneous inward and outward movement relative to the opening 21c. The actuator screws 24 and 26 are manually adjustable to selectively adjust the size and configuration of the aperture 27, see FIG. 2, in both length and width.

In operation of the optical image processor 1, assume that it is desired to detect a pictorial detail such as railroad ties in a scene. The preferred method of accomplishing this objective is to first adjust the aperture 27 to be of the desired size and shape by operation of the screw actuators 24 and 26 to obtain passage of the spatial frequency bandwidth or signal of the railroad ties through the aperture 27 while preventing or minimizing the passage of the other background signals therethrough. Once the optimum aperture size and shape is obtained, it is necessary to detect the signal of the railroad ties and also to detect the orientation of the railroad ties. Since the slide blocks 14 and 15 are independently movable in transverse directions, this may readily be accomplished through coordination of the movements of the slide blocks 14 and 15 by programming the driving signals for the variable speed, reversible DC motors 18 and 19 in accordance with motor control techniques which are well known in the art to effect any desired scanning movement of the aperture 27 in the spatial filter plane. For example, scanning of the spatial filter plane in frequency requires radial movement of the aperture 27 with respect to the central image. To obtain scanning in spatial frequency along a specified direction, the velocity of the slide block 14 in the $x$ direction, for example, must be a constant times the velocity of the slide block 15 in the $y$ direction.

Orientation of the frequency bandwidth relative to the central image, on the other hand, is detected by moving the aperture about the central image at a constant radius. To scan for orientation, the displacement of the slide block 14 in the $x$ direction, for example, would be the square root of the difference between the square of a constant and the square of the displacement of slide block 15 in the $y$ direction. This equation is derived from the familiar equation for a circle in terms of the $x$ and $y$ coordinates of a point on the circle and the radius (a constant) of the circle. Another mode of scanning may be accomplished by rotating the entire spatial filter 6 by operation of the drive gear assembly 12 and/or actuator screws 16 and 17. In this scanning mode, the spatial frequency of the signal is detected by movement of the aperture 27 relative to the central image by the selective operation of actuator screws 16 and/or 17 while orientation of the signal is detected by rotation of the aperture 27 about the central image by operation of drive gear assembly 12.

Likewise, raster scanning may also be accomplished by causing the motor 18 to move slide block 14 a predetermined distance in one direction, then reverse the direction of the slide block 14 until it returns to the starting point and so on in a cyclic manner, and at the same time causing control device 19 to move the slide block 15 in a direction perpendicular to the line of movement of the slide block 14, but at a much slower rate so that the aperture will follow a zigzag path. Alternately, the slide block 15 could be moved an incremental amount each time the continuously moving slide block 14 reverses its direction so that the aperture will trace a plurality of parallel spaced-apart lines.

In any of these ways, the aperture 27 will scan the transformed representation of a scene or a selected area thereof in the spatial filter plane. As the aperture 27 scans the transformed representation of the background pictorial details of the transparency at a region in the filter plane where light energy diffracted by a repetitive pictorial detail, such as railroad ties, in the scene carried by the transparency predominates, the image thereof is displayed in the image plane in strong contrast to the background, which diffracts only a small fraction of its energy through this region of the filter plane. Also, when this region is scanned at a predetermined rate of between 3 and 10 times a second, each time it is crossed, the repetitive pictorial detail stands out, giving it the appearance of blinking and greatly simplifying detection thereof. One other important feature of the optical image processor is that when a spatially coherent white light source 2 is employed a colored representation of the pictorial details of the scene results, in which pictorial details with different spatial frequencies appear in contrasting colors. This color contrast, which greatly facilitates the detection of the selected pictorial details in the scene, results from the well-known fact that a diffraction grating subjected to white light produces a spectral array of colors. The function of the diffraction grating is performed by the repetitive pictorial detail, exemplified herein as railroad ties, in the scene being enhanced.

In summary, the optical image processing apparatus of this invention optically enhances pictorial details in a scene, facilitating the location and detection of these details. This is made possible by the mounting of an aperture in a spatial filter plane so that the aperture is made selectively movable to any location within the spatial filter plane and may be caused to scan the spatial filter plane by selective controlling of the sign and amplitude of the voltage supplied to the reversible DC motors which position the aperture within the spatial filter plane. Also, the size and shape of the aperture may be selectively adjusted to permit optimizing the spatial frequency band to be enhanced.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An optical image processor comprising in combination:

a spatially coherent light source;
an optical train positioned to receive said light source;
a spatial filter plane in said optical train;
a spatial filter located in said spatial filter plane, said spatial filter including
   a rotatably mounted base means having an opening therein;
first cross-slide means movably mounted on said base means for linear movement therealong in a predetermined path which includes said opening;
second cross-slide means movably mounted on said first cross-slide means for linear movement therealong in a path substantially transverse to the path of movement of said first cross-slide;
shutter carrier means mounted on said second cross-slide; and
variable aperture shutter means carried by said shutter carrier means, whereby there is provided in the spatial filter plane a spatial filter having an aperture whose size and location within the spatial filter plane can be varied.

2. For use in an optical image processor, a spatial filter comprising:
   support means;
   base means carried on said support means for continuous rotation relative to said support means;
   first cross-slide means movably mounted on said base means for linear movement therealong in a predetermined path;
   second cross-slide means movably mounted on said first cross-slide means for linear movement therealong in a path substantially transverse to the path of movement of said first cross-slide;
   shutter carrier means mounted on said second cross-slide means; and
   variable aperture shutter means carried by said shutter carrier means.

3. Apparatus as in claim 2 wherein said variable aperture shutter means comprises:
   a first pair of shutter members mounted on said shutter carrier means for sliding movement therealong over a fixed path;
   first actuator means connected to said first pair of shutter members to cause said shutter members to be selectively movable away from and toward one another;
   a second pair of shutter members mounted on said shutter carrier means for sliding movement therealong in a path substantially transverse to the path of movement of said first pair of shutters;
   second actuator means connected to said second pair of shutter members to cause said second pair of shutter members to be selectively movable away from and toward one another;
   the path of movement of said first pair of shutter members being in a plane parallel to the plane containing the path of movement of said second pair of shutter members; and
   said paths being positioned so that the area between the shutter members of the first pair of shutter members overlaps the area between the shutter members of the second pair of shutter members.

* * * * *